(12) United States Patent
Gandhi et al.

(10) Patent No.: US 11,652,905 B2
(45) Date of Patent: May 16, 2023

(54) SYSTEMS AND METHODS FOR CONTROLLING REAL-TIME TRAFFIC SURGE OF APPLICATION PROGRAMMING INTERFACES (APIS) AT SERVER

(71) Applicant: Jio Platforms Limited, Mumbai (IN)

(72) Inventors: Sanjay Gandhi, Faridabad (IN); Manvendra Rai, Thane West (IN); Anshul Agrawal, Ghaziabad (IN)

(73) Assignee: JIO PLATFORMS LIMITED, Mumbai (IN)

( * ) Notice: Subject to any disclaimer, the term of this patent is extended or adjusted under 35 U.S.C. 154(b) by 361 days.

(21) Appl. No.: 16/639,720

(22) PCT Filed: Aug. 13, 2018

(86) PCT No.: PCT/IB2018/056078
§ 371 (c)(1),
(2) Date: Feb. 17, 2020

(87) PCT Pub. No.: WO2019/034979
PCT Pub. Date: Feb. 21, 2019

(65) Prior Publication Data
US 2020/0374365 A1 Nov. 26, 2020

(30) Foreign Application Priority Data
Aug. 14, 2017 (IN) .............................. 201721028866

(51) Int. Cl.
*H04L 67/60* (2022.01)
*G06F 9/54* (2006.01)
(Continued)

(52) U.S. Cl.
CPC ............. *H04L 67/60* (2022.05); *G06F 9/547* (2013.01); *H04L 63/0236* (2013.01); *H04L 67/1012* (2013.01); *H04L 67/63* (2022.05)

(58) Field of Classification Search
CPC . H04L 67/60; H04L 63/0236; H04L 67/1012; H04L 67/63; H04L 63/1458;
(Continued)

(56) References Cited

U.S. PATENT DOCUMENTS 5,603,029 A * 2/1997 Aman .................. G06F 9/5083
710/39
5,907,675 A * 5/1999 Aahlad .................. G06F 9/465
709/203

(Continued)

OTHER PUBLICATIONS

International Search Report and Written Opinion issued in International Application No. PCT/IB2018/056078, dated Feb. 21, 2019.

*Primary Examiner* — Ramy M Osman
(74) *Attorney, Agent, or Firm* — Westman, Champlin & Koehler, P.A.

(57) ABSTRACT

The present invention relates to systems and methods for controlling real-time traffic surge at a server [102]. An Application Programming Interface (API) gateway [104] receives at least one service request from at least one application device [106] for availing at least one service from a server [102], and enables at least one part of the server [102] based on a count of the received requests determined by a load counter. A throttling parameter, including one of a static throttling parameter and a dynamic throttling parameter, is determined by a throttling parameter module [204] for the enabled at least one part of the server [102]. The API gateway [104] validates the at least one service request based on the count and the throttling parameter. Thereafter, the at least one part of the server [102] provides at least one service to the validated at least one application device [106].

15 Claims, 4 Drawing Sheets

(51) Int. Cl.
  *H04L 9/40* (2022.01)
  *H04L 67/1012* (2022.01)
  *H04L 67/63* (2022.01)

(58) Field of Classification Search
  CPC .. H04L 67/1008; H04L 67/5651; G06F 9/547
  See application file for complete search history.

(56) References Cited

U.S. PATENT DOCUMENTS

| | | | | |
|---|---|---|---|---|
| 6,549,541 | B1* | 4/2003 | Sainio | H04Q 11/0478 370/429 |
| 8,417,817 | B1* | 4/2013 | Jacobs | H04L 69/28 709/224 |
| 9,882,771 | B2* | 1/2018 | Sugumar | H04L 49/00 |
| 2002/0138643 | A1* | 9/2002 | Shin | H04L 47/19 709/223 |
| 2002/0161914 | A1* | 10/2002 | Belenki | H04L 47/15 709/233 |
| 2002/0188738 | A1* | 12/2002 | Gray | H04L 12/2876 709/229 |
| 2004/0111506 | A1* | 6/2004 | Kundu | H04L 67/1012 709/223 |
| 2005/0157647 | A1* | 7/2005 | Sterne | H04L 63/0227 370/235 |
| 2006/0239249 | A1* | 10/2006 | Banner | H04L 67/02 370/352 |
| 2009/0063617 | A1 | 5/2009 | Calow et al. | |
| 2010/0174690 | A1* | 7/2010 | Marcotte | G06F 16/178 707/E17.01 |
| 2011/0153822 | A1* | 6/2011 | Rajan | H04L 67/14 718/1 |
| 2011/0153839 | A1* | 6/2011 | Rajan | H04L 67/1008 709/227 |
| 2013/0275617 | A1 | 10/2013 | Rajan et al. | |
| 2014/0036672 | A1* | 2/2014 | Kulkarni | H04L 47/22 370/230.1 |
| 2014/0283030 | A1* | 9/2014 | Moore | H04L 63/1425 726/22 |
| 2015/0120808 | A1* | 4/2015 | Bielski | H04L 67/62 709/203 |
| 2018/0373885 | A1* | 12/2018 | Arad | G06F 21/6254 |

* cited by examiner

SYSTEMS AND METHODS FOR CONTROLLING REAL-TIME TRAFFIC SURGE OF APPLICATION PROGRAMMING INTERFACES (APIS) AT SERVER

CROSS-REFERENCE TO RELATED APPLICATION(S)

This application is a Section 371 National Stage Application of International Application No. PCT/IB2018/056078, filed Aug. 13, 2018, and claims priority to Indian Application No. 201721028866, filed Aug. 14, 2017, the contents of each of which are hereby incorporated by reference in their entireties.

TECHNICAL FIELD

The present invention relates generally to controlling traffic surge of clients' requests at servers, and more particularly to systems and methods for controlling traffic surge of Application Programming Interfaces (APIs) at a server in real-time.

BACKGROUND

In recent years there has been an increased use of consumer electronic devices such as mobile devices, smartphones, personal digital assistants, laptops, tablets, etc, for both personal and commercial purposes. Accordingly, usage of the Internet and the Internet based applications, has also tremendously increased. As a result, the Internet traffic patterns have changed dramatically in last few years and are going to be more unpredictable in the coming years.

Many consumer electronic devices provide one or more applications or 'apps' to the users. These applications are either pre-installed in said electronic devices or can be downloaded and installed according to user requirements and preferences. The development of these applications also requires to make data transaction with the remote servers. The increase in development processes of these applications and subsequently, increase in the use of the applications by the end users, have further resulted in high traffic of data transaction across a communication network.

In the existing scenarios, various client applications typically support different kinds of platforms and devices such as desktops, laptops, mobile devices and tablets that run different operating systems such as iOS, Android etc. The primary challenge of the server in such scenarios lies in allowing the execution by the server for different client applications service requests, without any disruptions.

One of the solutions to the above-mentioned challenge is to introduce an API gateway that operates as a single-entry point for all client requests before these requests are served by the server. However, when the requests from the client devices are huge in number, or are of at a large scale, the API gateways are also unable to handle the requests and eventually encounter traffic surge. Thus, the problem of traffic surge still remains, because the client applications always have to be connected online which in turn generate a large amount of signalling traffic. The growth in signals by the client devices eventually leads to traffic surge. Another common cause for traffic surge is the expansion of features of the client application. Also, when any application becomes popular amongst its users, the usage is more and hence the traffic also grows. The continuing increase in the traffic thus requires a dynamic provision in the API gateway to accordingly meet the client application requests with greater capacity availability in the servers.

However, the capacity of the servers to cater to the incoming requests from the client devices cannot be increased to infinite. Therefore, there is a need in the art that provides solution to the above problem that is seamless and efficient method for managing the server capacity such that it survives the traffic surge for a number of client application requests in real-time. There is a further need for automatically providing increase in server uptime and reliability in the event of any unexpected surge of traffic.

SUMMARY

This section is provided to introduce certain aspects of the present invention in a simplified form that are further described below in the detailed description. This summary is not intended to identify the key features or the scope of the claimed subject matter.

In view of the afore-mentioned drawbacks and limitations of the prior art, one or more disclosed embodiments of the present invention to provide methods and systems for controlling traffic sugre of clients' requests at servers. Additionally, one or more disclosed embodiments of the invention provide methods and systems for controlling real-time traffic surge of Application Programming Interfaces (APIs) at a server. Still further, one or more disclosed embodiments of the invention provide methods and systems for automatically providing increase in application uptime and reliability in the event of any unexpected traffic surge at the server. And still further, one or more disclosed embodiments of the invention provide methods and systems for controlling the traffic surge by preventing any unauthentic and futile retry requests at the server.

In view of these and other disclosures, one aspect of the present invention may relate to a method for controlling traffic surge of Application Programming Interfaces (APIs) at a server [102] in real-time. The method comprises configuring an API gateway [104] in communication to the server [102] for receiving at least one service request from at least one application device [106] for availing at least one service, wherein the at least one service is provided by at least one part of the server [102]. Thereafter, a count of the at least one service request received from the at least one application device [106], is determined by a load counter module [202]. The API gateway [104] enables the at least one part of the server [102] based on the count of the at least one service request received from the at least one application device [106]. Further, a throttling module determines a throttling parameter for the at least one part of the server [102] enabled by the API gateway [104], wherein the throttling parameter includes one of a static throttling parameter and a dynamic throttling parameter. The method further comprises configuring the API gateway [104] for one of: validating and invalidating, each of the at least one service request based on the count of the at least one service request and the throttling parameter. Thereafter, the at least one part of the server [102], provides the at least one service to each of the at least one application device [106] in an event the at least one service request is validated.

Another aspect of the invention may relate to a system [100] for controlling traffic surge of Application Programming Interfaces (APIs) at a server [102]. The system [100] comprises an API gateway [104] communicably connected to the server [102]. The API gateway [104] is configured to receive at least one service request from at least one application device [106] for availing at least one service, wherein the at least one service is provided by at least one part of the server [102]. A load counter module [202] is configured to determine a count of the at least one service request received from the at least one application device [106]. The API gateway [104] is also configured to enable the at least one part of the server [102] based on the count of the at least one service request received from the at least one application device [106]. A throttling module is configured to determine a throttling parameter for the at least one part of the server [102] enabled by the API gateway [104], wherein the throttling parameter includes one of a static throttling parameter and a dynamic throttling parameter. Thereafter, the API gateway [104] is configured to one of validate and invalidate each of the at least one service request based on the count of the at least one service request and the throttling parameter. The at least one part of the server [102] thereafter provides the at least one service to each of the at least one application device [106] in an event the at least one service request is validated.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components. The connections between the sub-components of a component have not been shown in the drawings for the sake of clarity, therefore, all sub-components shall be assumed to be connected to each other unless explicitly otherwise stated in the disclosure herein.

DETAILED DESCRIPTION

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only one of the problems discussed above.

The present invention encompasses systems and methods for controlling traffic surge of a plurality of clients' requests at servers. The invention encompasses control of traffic surge of Application Programming Interfaces (APIs) at the server [102] in real-time by dynamically validating each of the requests received from the application device [106]. The invention encompasses management of the server capacity such that it survives the traffic surge for a number of client application requests in real-time and provides increase in server [102] uptime and reliability in the event of any unexpected surge of traffic.

As used herein, "hardware" includes a combination of discrete components, an integrated circuit, an application specific integrated circuit, a field programmable gate array, other programmable logic devices and/or other suitable hardware as may be obvious to a person skilled in the art.

As used herein, "software" includes one or more objects, agents, threads, lines of code, subroutines, separate software applications, or other suitable software structures as may be obvious to a skilled person. In one embodiment, software can include one or more lines of code or other suitable software structures operating in a general-purpose software application, such as an operating system, and one or more lines of code or other suitable software structures operating in a specific purpose software application.

As used herein, the "applications" are the software applications residing in the consumer electronic devices and can be either pre-installed or can be downloaded and installed in the said consumer electronic devices. The native applications include, but are not limited to, contact management application, calendar application, messaging applications, image and/or video modification and viewing applications, gaming applications, navigational applications, office applications, business applications, educational applications, health and fitness applications, medical applications, financial applications, social networking applications, and any other application. The application uses "data" that can be created, modified or installed in an electronic device over time. The data includes, but is not limited to, contacts, calendar entries, call logs, SMS, images, videos, factory data, and data associated with one or more applications.

As used herein an "Application Programming Interface (API)" is a code that facilitates various software programs or components to communicate with each other. An API can include a set of protocol, subroutine definitions and tools which are used in building application software associated with a particular operating system or computing platform. It allows an application programmer to efficiently develop an application program capable of interfacing with the computing platform as the interface work is already done by the API.

As used herein, "couple" and its cognate terms, such as "couples" and "coupled" includes a physical connection (such as a conductor), a virtual connection (such as through randomly assigned memory locations of data memory device), a logical connection (such as through logical gates of semiconducting device), other suitable connections, or a combination of such connections, as may be obvious to a skilled person.

As used herein, "application device" includes, but is not limited to, a mobile phone, smart phone, set-top boxes, smart television, laptop, a general-purpose computer, desktop, personal digital assistant, tablet computer, mainframe computer, or any other computing device as may be obvious to a person skilled in the art.

Figure 1:
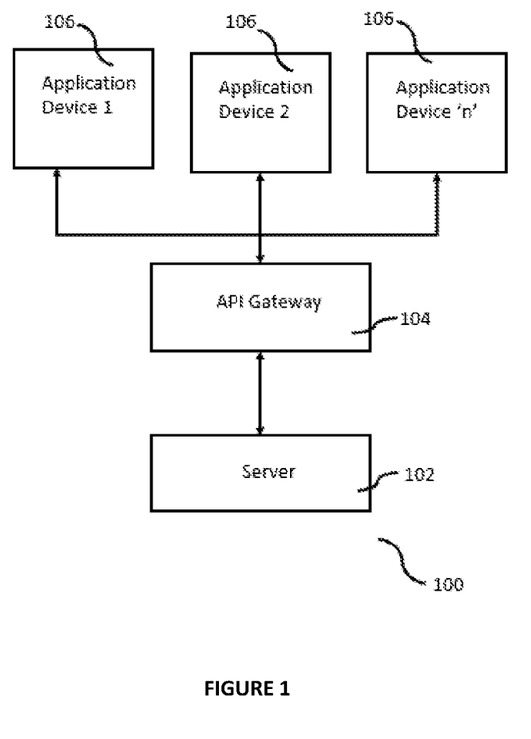
FIG. 1 illustrates a system architecture [100] for controlling real-time traffic surge of Application Programming Interfaces (APIs) at a server [102], in accordance with exemplary embodiments of the present disclosure.

FIG. 1 is a block diagram illustrating a system [100] for controlling real-time traffic surge of Application Programming Interfaces (APIs) at a server [102], in accordance with exemplary embodiments of the present disclosure. As shown in FIG. 1, the system [100] comprises a server [102] communicably coupled to an API gateway [104]. The system [100] is configured to receive a plurality of requests from at least one applications device [106]. The server [102] dynamically executes at least one of the plurality of requests received that is validated by the API gateway [104].

The API gateway [104] is configured to enable at least one part of a server [102] to provide service to the incoming requests from one or more application devices [106] in a controlled manner and also to manage the server [102] capacity such that it survives the traffic surge for a number of requests in real-time. The API gateway [104] receives at least one service request from at least one application device [106] for availing at least one service, wherein the at least one service is provided by at least one part of the server [102]. The API gateway [104] is also configured to prevent or deny malicious and unauthorized requests from any application device [106] to enter into the server [102]. For any malicious, unauthorized, or the denied requests, a notification such as 'an error code' is sent to the corresponding application device [106]. The notifications or error codes are also sent in the event of the request being invalidated by the API gateway [104]. The notifications or error codes indicate that the received request has not been executed by the at least one part of the server [102] enabled by the API gateway [104]. In a typical scenario of developing an enterprise application or software application, the application devices [106] may require execution time of the server [102] in real-time while sending the requests to be executed. As the one or more application devices [106] may support different kinds of platforms and operating systems, the requests being sent from these application devices [106] are also of different kinds and formats. The one or more application devices [106] may include laptop or desktop clients, mobile device clients, set-top box clients, web-based clients etc. For example, a desktop version of client application device [106] is typically more elaborated in its features as compared to that of a mobile device application version. The embodiments of the present disclosure encompass configuring the API gateway [104] such that the server [102] is facilitated to dynamically cater to the requirements of different kinds of service requests received in real-time from different kinds of the application devices [106] without getting overloading. This is accomplished by dynamically specifying an available capacity limit of the server [102] to execute the requests. Also, the malicious and unauthorized requests are prevented to thereby control the traffic surge of various requests being sent at the server [102] end in real-time. Thus, the system [100] dynamically handles the traffic surge during peak service requests by the various client application devices [106].

The system [100] is also communicably associated with a database or a repository [108] configured to store the data and information pertaining to controlling the traffic surge at the server [102] in accordance with the present invention.

Embodiments of the present disclosure will now be discussed with details of the structural and functional features of the system [100].

Figure 2A:
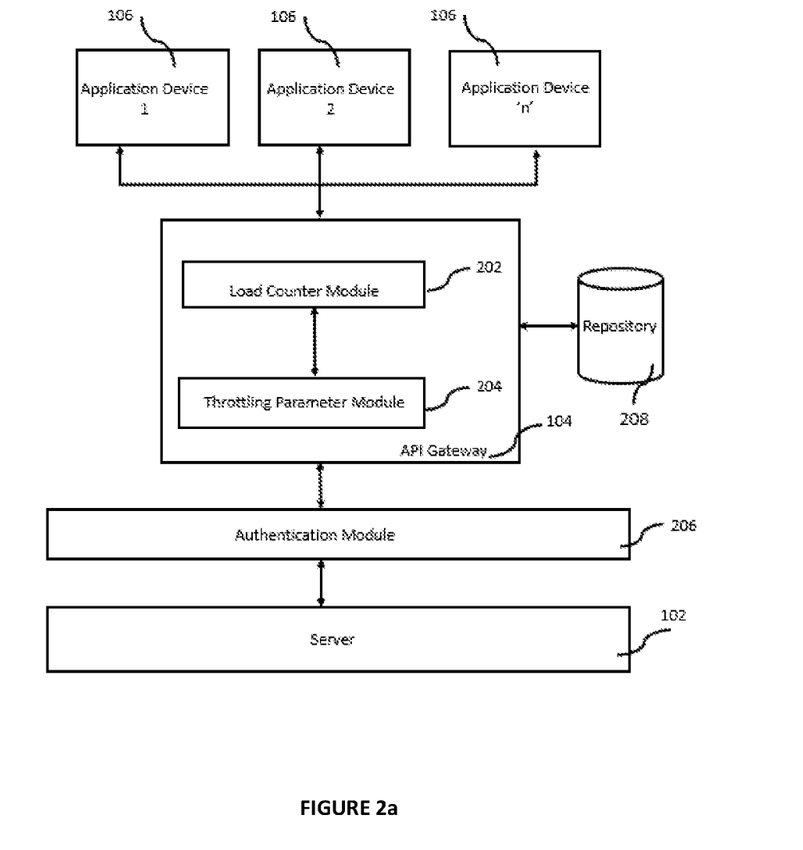
FIG. 2a and FIG. 2b are block diagrams illustrating the system [100] elements for controlling the real-time traffic surge at the server [102] by setting limits to the incoming requests from client application devices [106], in accordance with exemplary embodiments of the present disclosure.

FIG. 2a is a block diagram illustrating the system [100] elements for controlling the real-time traffic surge at the server [102] by configuring the API gateway [104] for setting limits to the incoming requests from at least one application device [106], in accordance with exemplary embodiments of the present disclosure. As explained above, different application devices [106] send a plurality of requests to avail one or more services from the server [102]. Each of the plurality of requests are passed through the API gateway [104] before it is executed by the server [102]. The API gateway [104] is communicably coupled or connected to the one or more application devices [106] as well as the server [102], so that it is capable of seamlessly performing the necessary data transaction between the one or more application devices [106] and the server [102]. The API gateway [104] is configured for controlling the requests traffic by denying server's [102] runtime to those requests received from the client application devices [106] that are invalidated by the API gateway [104]. The API gateway [104] also prevents any redundant or repeated entries of the requests from the application devices [106].

In one embodiment herein, the API gateway [104] comprises a load counter module [202], a throttle parameter module [204]. An authorization module [206] is also provided in communication with the API gateway [104] for authorizing the requests received by the API gateway [104]. Further, the API gateway [104] enables at least one part of the server [102] by setting a predefined limit of the server [102] capacity below the server [102] maximum capacity. The set limit is below the server [102] maximum capacity and once the incoming requests count exceed this limit, the API gateway [104] does not send further service requests to the at least one part of the server [102] that has been enabled.

Figure 2B:
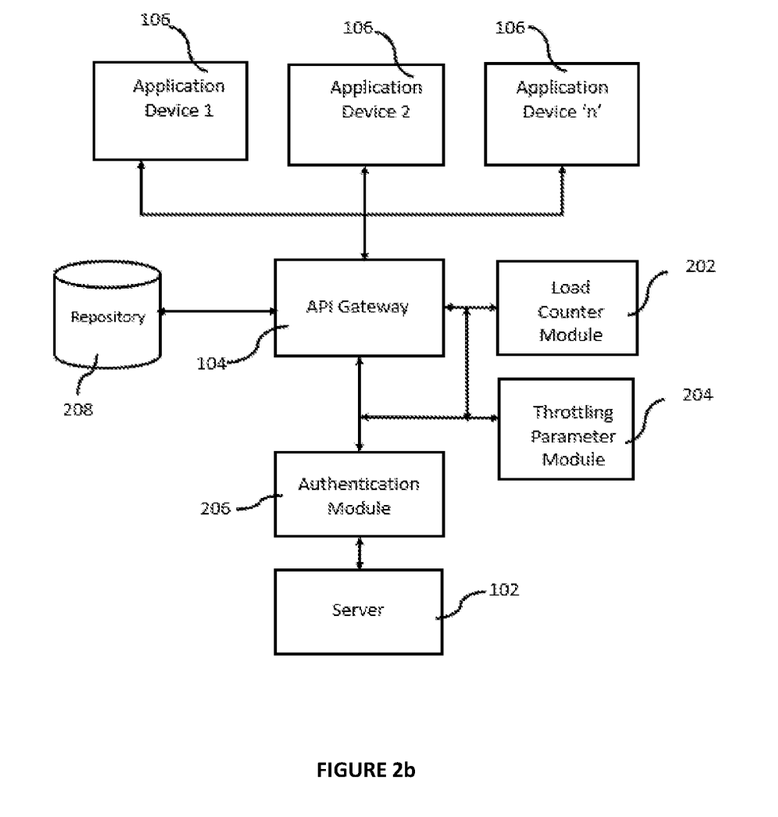

The load counter module [202] is coupled in communication with the API gateway [104] for counting the number of the requests being received from the application devices [106]. In on embodiment of the present invention, the load counter module [202] is installed within the API gateway [104]. In another embodiment, and as shown in FIG. 2b, the load counter module [202] is provided as an external device that is communicably coupled with the API gateway [104]. The load counter module [202] is triggered with the occurrence of each request hit at the API gateway [104] and also with the completion of execution of any validated requests. The current count of the load counter [202] is incremented upon receiving a new request from the at least one application device [106]. Thus, all the requests that are being received by the API gateway [104] are counted by the load counter [202] to precisely estimate the expected load on the server [102] and accordingly generate a limit policy for validating the received request and thereby managing the server-load within its capacity at a given instant or time. The current count as determined by the load counter module [202], thus facilitates in identifying any unexpected traffic surge that is about to occur at the server [102] end. This enables the API gateway [104] to accordingly handle the traffic surge so that at least one part of the server [102] is enabled to serve the requests for a limited capacity and rest part of the server [102] is not unnecessarily overloaded beyond its capacity.

Once a request is successfully executed by the enabled at least one part of server [102], the current count of the load counter module [202] is decremented. Thus, the load counter module [202] is incremented with each new request received and is decremented with each successful execution of the received request. The count is also decremented, each time the notification to the at least one application device [106] is sent in response to the at least one service request.

Further, the at least one request received from the application devices [106], undergoes a unique validation test based on the current count as determined by the load counter module [202] and a throttling parameter. The execution of the received request is performed by the at least one part of the server [102] enabled by the API gateway [104], in the event of obtaining a positive result of a corresponding validation test.

According to the embodiments of the present invention, the throttling parameter is determined for the at least one part of the server [102] enabled by the API gateway [104]. The throttling parameter module [204] is configured to determine the throttling parameter, wherein the throttling parameter includes one of a static throttling parameter and a dynamic throttling parameter. The throttling parameter module [204] is configured within the API gateway [104]. Alternatively, the throttle parameter module [204] is a separate device that is communicably coupled with the API gateway [104], as shown in FIG. 2b. In one embodiment of the present invention, the throttling parameter is predefined using at least one of: a static limit or a dynamic limit of the server [102] for handling a number of requests in real-time. The static-limit of the server [102] is the fixed capacity of the server [102] to handle execution of fixed number of client requests at a given time, whereas the dynamic limit of the server [102] varies due to various parameters such as rate of traffic. This improves the end user experience by automatically providing increase in application uptime and reliability in the event of an unexpected surge of traffic.

The throttling parameter is further based on a time period that can be set at one of a plurality of granular levels including the units of second, minute, hour, day, month, and year. The setting of the time period at a granular level facilitates in defining a rate limit policy to limit or control the rate at which the requests are sent to the enabled at least one part of the server [102] for executing the requests. Therefore, if the number of requests hitting API gateway [104] exceeds the set rate limit, or quota limit then the API gateway [104] stops redirecting such requests to backend APIs, i.e. the server [102] thereby preventing traffic burst. Further, at least one rate limit policy is set using filter on one or more parameters of the client application device [106] such as a user ID, a client-app ID etc. The API gateway [104] can be therefore configured to set the limits based on the one or more parameters including client ID, client application types, client Operating System (OS) types, and a quota limit. The client ID provides the identity of the device such as name, identification code or number of the client application device [106] which can be used by the API gateway [104] and various other modules to identify the device. Further, the client OS types include but are not limited to iOS, Android, KaiOS, Linux based OS. These operating systems may either run in a browser environment for devices like computer desktop, laptop, set-top boxes etc; or in an app environment of the application device [106] such as mobile devices, tablets etc.

The throttling parameter is a value that is used along with the load count value by a validation module of the API gateway [104] to run a unique validation test against each of the plurality of requests received. Thus, the validation test is based on at least one of: the instant count determined by the load counter module [202], and the throttling parameter determined for the at least one part of the server [102] enabled. The throttling parameter includes one of a static throttling parameter and a dynamic throttling parameter. If the result of the validation test for any request is positive, then that request is executed by the server [102]. On the other hand, if the result of the validation test for any request is negative, i.e. the request is invalidated by the API server [102], then that request is denied and is not sent to the server [102] for execution. For any requests failing the validation test, a notification for example an HTTP429 error code is sent from the server [102] to the corresponding application device [106]. Thus, the API gateway [104] transmits notifications to the at least one application device [106] in an event the at least one service request is invalidated. For each time the notification to the at least one application device [106] is sent in response to the at least one service request, the count is decremented by the load counter module [202]. According to the embodiments of the present invention, the at least service request is also invalidated in an event the count of the at least one service request exceeds the throttling parameter.

In one embodiment of the present invention, the API gateway may be configured to receive a self-feedback using a machine learning module associated with the API gateway such that, over a period of time and based on its historical data, the API gateway self-learns the operation of filtering the service requests for similar kinds of traffic pattern. Thus, the API gateway, based upon its previous performed operations on the received service requests, performs similar operations on the subsequent incoming service requests of similar types and for similar parameters.

The API gateway [104], the load counter module [202] and the throttling parameter module [204] may be associated with at least one processor configured to perform data processing, input/output processing, and/or any other functionality that enables the working of the system [100] in accordance with the present disclosure. As used herein, a "processor" refers to any logic circuitry for processing instructions. A processor may be a special purpose processor or plurality of microprocessors, wherein one or more microprocessors may be associated with at least one controller, a microcontroller, Application Specific Integrated Circuits (ASICs), Field Programmable Gate Array (FPGAs) circuits, and any other type of integrated circuit (IC), etc. The at least one processor may be a local processor present in the vicinity of the API gateway [104], the load counter module [202] and the throttling parameter module [204]. The at least one processor may also a processor at a remote location that processes the method steps as explained in present disclosure. Among other capabilities, the processor is also configured to fetch and execute computer-readable instructions and data stored in a memory or a data storage device.

According to the embodiments of the present invention, the database or repository [108] may be implemented using a memory, any external storage device, an internal storage device that may be configured in communication with the API gateway [104] for storing the load count value and the throttling parameter values along with other parameters used for controlling the traffic surge at the server [102] by the system [100]. The memory may also store instructions to be executed, any information, and data, used by the system [100] to implement the functions of controlling the traffic surge at the server [102]. As used herein, a "memory" or "repository" refers to any non-transitory media that stores data and/or instructions that cause a machine to operate in a specific manner. The memory may include a volatile memory or a non-volatile memory. Non-volatile memory includes, for example, magnetic disk, optical disk, solid state drives, or any other storage device for storing information and instructions. Volatile memory includes, for example, a dynamic memory. The memory may be a single or multiple, coupled or independent, and encompasses other variations and options of implementation as may be obvious to a person skilled in the art.

The processor, memory, and the system [100] are interconnected to each other, for example, using a communication bus. The "communication bus" or a "bus" includes hardware, software and communication protocol used by the bus to facilitate transfer of data and/or instructions. The communication bus facilitates transfer of data, information and content between these components.

The one or more application devices [106] may operate on the same or different operating systems including the Android OS, the Apple iOS, Blackberry OS, Symbian, Web OS, Windows Phone OS, etc. Although only limited number of client application devices [106], viz. application device 1, application device 2, and application device 'n', are shown in FIG. 1, FIG. 2a and FIG. 2b, however, the API gateway [104] may receive the requests from a plurality of application devices [106].

In an exemplary embodiment, the system [100] comprises the authentication module [206] for providing authentication of the requests received from the client application device [106]. The API gateway [104] sets limit policies for the incoming requests and provides one of: the validation and invalidation of the received requests. The authentication module [206] authenticates the validated requests for determining and thereafter preventing any malicious requests to enter into the at least one part of the server [102] for execution. Thus, the incoming requests are further filtered by the authentication module [206] which allows only the authorized requests to be sent to the server [102] for execution. The unauthorized requests are denied from entering into the server [102] and subsequently, notifications or error codes are sent to the respective application devices [106]. The authentication module [206] authorizes the received requests based on various parameters such as client ID. In one embodiment herein, the authentication module [206] checks and matches the credentials of the application devices [106] with the pre-stored credentials for providing authentication. The authentication module [206] is associated with the database or repository [108] to store and retrieve the data pertaining to the authentication processes.

Thus, the system [100] is configured to validate, invalidate, and authenticate the incoming service requests or requests in order to control the traffic load at the server [102] for all kinds of traffic conditions, i.e. for low traffic or low number of incoming requests, and also during peak traffic scenarios. During high incoming traffic, the limit policies based on the load counter [202] value and the throttling limits are implemented by the API gateway [104] along with the authentication process to control the traffic surge. The embodiments of the present invention therefore improve the end-user experiences in gaining server's uptime in all traffic conditions ranging from low-to-high and high-to-low.

Figure 3:
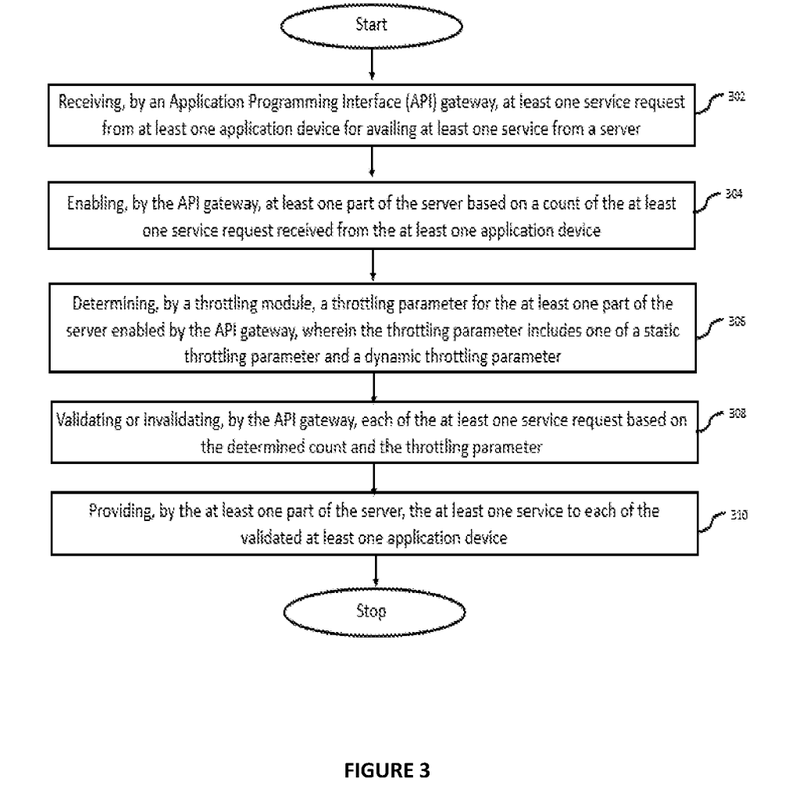
FIG. 3 illustrates a method for controlling real-time traffic surge of Application Programming Interfaces (APIs) at the server [102], in accordance with exemplary embodiments of the present disclosure.

FIG. 3 illustrates a method for controlling real-time traffic surge of Application Programming Interfaces (APIs) at a server [102], in accordance with exemplary embodiments of the present disclosure. The method is initiated by configuring the API gateway [104] in communication to the server [102] for receiving each of the plurality of requests that are sent from the at least one application device [106] for availing at least one service from the server [102]. Thus, the requests to be sent to the server [102] for execution are received by the API gateway [104] at step [302] for availing at least one service, wherein the at least one service is provided by at least one part of the server [102]. The API gateway [104] enables the at least one part of the server [102] by enabling the at least one part of the server [102] up to a maximum part of the server [102] in an event the count of the at least one service exceeds a predefined service request limit.

At step [304], the load count value is determined by the load counter module [202]. The load counter module [202] is installed in communication with the API gateway [104] for counting number of the plurality of requests being received. The determined count value is incremented with each new request received by the API gateway [104]. The load counter value at given instant, thus identifies the expected load on the server [102]. This facilitates the API gateway [104] to accordingly handle the traffic surge so that the server [102] is unnecessarily not overloaded beyond its capacity. The current count of the load counter [202] is decremented in the event of a request being successfully executed by the at least one part of the server [102]. Each time the at least one service is successfully provided by the at least one part of the server [102], the load counter module [202] decrements the load count value.

At step [306] the throttle parameter is determined based on a requests handling capacity of the server [102] in real-time, wherein the throttle parameter is determined by the throttling parameter module [204], and wherein the throttling parameter includes one of a static throttling parameter and a dynamic throttling parameter. The throttling parameter module [204] is communicably associated with the API gateway [104]. The throttling parameter is determined using at least one of: a static limit or a dynamic limit of the server [102] for handling a number of requests in real-time. The throttling parameter is further determined based on one of a time-period, and a set at one of a plurality of granular levels including second, minute, hour, day, month, and year. The static throttling parameter corresponds to a predefined service handling capacity of the at least one part of the server [102]. The dynamic throttling parameter corresponds to an on-the-fly service handling capacity of the at least one part of the server [102], determined on the basis of at least one of: a device ID, a device type, an Operating System (OS) type, and a quota limit, of the application device [106]. Subsequently, based on the throttling parameter and the load counter count value, a unique validation test is processed by the API gateway [104] at step [308]. The unique validation test comprises one of: a validation and invalidation of each of the plurality of requests received. Further, the at least service request is validated in an event the count of the at least one service request is one of equal to and below the throttling parameter determined. The invalidated requests are denied execution by the at least one part of the server [102] enabled by the API gateway [104]. The API gateway [104] sends a notification to the at least one application device [106] in an event the at least one service request is invalidated. The denied or invalidated requests are required to re-enter the API gateway [104] and undergo the process of validation test. The at least service request is also invalidated in an event the count of the at least one service request exceeds the throttling parameter.

At step [310] the at least one part of the server [102] executes or provides the at least one service to each of the validated at least one application. The server [102] executes only those requests that pass the validation test and obtain a positive result of corresponding validation test.

While considerable emphasis has been placed herein on the disclosed embodiments, it will be appreciated that changes can be made to the embodiments without departing from the principles of the present invention. These and other changes in the embodiments of the present invention shall be within the scope of the present invention and it is to be understood that the foregoing descriptive matter is illustrative and non-limiting.

We claim:

1. A method for controlling a surge in traffic at a server, the method comprising:

receiving, by an Application Programming Interface (API) gateway, at least one service request from at least one application device for availing at least one service, wherein the at least one service is provided by one part of the server;

determining, by a load counter module, a count of the at least one service request received from the at least one application device;

enabling, by the API gateway, the one part of the server based on the count of the at least one service request received from the at least one application device;

determining, by a throttling module, a throttling parameter for the one part of the server enabled by the API gateway, wherein the throttling parameter includes a dynamic throttling parameter, wherein the dynamic throttling parameter indicates a dynamic limit of the server varying due to the surge in an incoming traffic rate in a time period, and wherein the dynamic throttling parameter further corresponds to an on-the-fly service handling rate limit filter, determined on the basis of at least one of a device ID, a device type, an Operating System (OS) type, and a quota limit, of the application device;

one of validating and invalidating, by the API gateway, each of the at least one service request based on the count of the at least one service request and the throttling parameter; and providing, by the enabled one part of the server, the at least one service to each of the at least one application device in an event the at least one service request is validated, wherein, in an event the at least one service request is invalidated, denying the invalidated at least one service request, by the API gateway, and not executing the at least one service to each of the at least one application device with the one part of the server based on the invalidated at least one service request.

2. The method as claimed in claim 1, further comprising transmitting, by the API gateway, a notification to the at least one application device in an event the at least one service request is invalidated.

3. The method as claimed in claim 1, wherein the count is incremented, each time a new service request is received.

4. The method as claimed in claim 1, wherein the count is decremented, each time the at least one service is provided by the enabled one part of the server against the unique service request.

5. The method as claimed in claim 1, wherein the count is decremented, each time the notification to the at least one application device is sent in response to the at least one service request.

6. The method as claimed in claim 1, wherein enabling the one part of the server includes enabling the one part of the server up to a maximum part of the server in an event the count of the at least one service exceeds a predefined service request limit.

7. The method as claimed in claim 1, wherein the throttling parameter further includes a static throttling parameter, and wherein the static throttling parameter corresponds to a predefined service handling capacity of the one part of the server.

8. The method as claimed in claim 1, wherein the throttling parameter is further determined based on one of a time-period, and a set at one of a plurality of granular levels including second, minute, hour, day, month, and year.

9. The method as claimed in claim 1, wherein the at least one service request is validated in an event the count of the at least one service request is one of equal to and below the throttling parameter.

10. The method as claimed in claim 1, wherein the at least one service request is invalidated in an event the count of the at least one service request exceeds the throttling parameter.

11. The system as claimed in claim 1, wherein the throttling parameter is further based on a rate at which the at least one service request is sent to the enabled one part of the server for execution of the at least one service request.

12. A system for controlling a surge in traffic at a server, the system comprising:

an Application Programming Interface (API) gateway configured to receive at least one service request from at least one application device for availing at least one service, wherein the at least one service is provided by one part of the server;

a load counter module configured to determine a count of the at least one service request received from the at least one application device;

the API gateway configured to enable the one part of the server based on the count of the at least one service request received from the at least one application device;

a throttling module configured to determine a throttling parameter for the one part of the server enabled by the API gateway, wherein the throttling parameter includes a dynamic throttling parameter, wherein the dynamic throttling parameter indicates a dynamic limit of the server varying due to the surge in traffic, and wherein the dynamic throttling parameter further corresponds to an on-the-fly service handling capacity rate limit filter, determined on the basis of at least one of a device ID, a device type, an Operating System (OS) type, and a quota limit, of the application device;

the API gateway configured to one of validate and invalidate each of the at least one service request based on the count of the at least one service request and the throttling parameter; and the enabled one part of the server configured to provide the at least one service to each of the at least one application device in an event the at least one service request is validated, wherein, in an event the at least one service request is invalidated, the API gateway further configured to deny the at least one service request such that the one part of the server does not execute the at least one service to each of the at least one application device.

13. The system as claimed in claim 12, further comprising a database configured in communication with the API gateway for storing the throttling parameter and the count of the at least one service request.

14. The system as claimed in claim 12, further comprising an authentication module configured to authorize the plurality of requests received from the at least one client application device for availing the at least one service from the server.

15. The system as claimed in claim 12, wherein the throttling parameter is further based on a rate at which the at least one service request is sent to the enabled one part of the server for execution of the at least one service request.

* * * * *